(12) United States Patent
Zhang (10) Patent No.: US 10,798,095 B2
(45) Date of Patent: Oct. 6, 2020

(54) AUTHENTICATION METHOD, DEVICE AND AUTHENTICATION CLIENT

(71) Applicant: ALIBABA GROUP HOLDING LIMITED, Grand Cayman (KY)

(72) Inventor: Nana Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/867,527

(22) Filed: May 5, 2020

(65) Prior Publication Data
US 2020/0267149 A1 Aug. 20, 2020

Related U.S. Application Data

(63) Continuation of application No. 16/272,852, filed on Feb. 11, 2019, which is a continuation of application No. PCT/CN2017/095110, filed on Jul. 31, 2017.

(30) Foreign Application Priority Data

Aug. 12, 2016 (CN) .......................... 2016 1 0663316

(51) Int. Cl.
*H04L 29/06* (2006.01)
*G06F 21/31* (2013.01)
(Continued)

(52) U.S. Cl.
CPC ...... *H04L 63/0884* (2013.01); *G06F 16/9558* (2019.01); *G06F 21/31* (2013.01);
(Continued)

(58) Field of Classification Search
CPC .................. H04L 63/0884; H04L 63/0892
See application file for complete search history.

(56) References Cited

U.S. PATENT DOCUMENTS

| 5,586,260 | A | * | 12/1996 | Hu | .......................... | G06F 21/33 |
| | | | | | | 704/272 |
| 2006/0264202 | A1 | * | 11/2006 | Hagmeier | ............... | H04L 67/02 |
| | | | | | | 455/411 |

(Continued)

OTHER PUBLICATIONS

PCT Written Opinion of the International Searching Authority for International application No. PCT/CN2017/095110, dated Oct. 31, 2017, 14 pages. (Year: 2017).*

*Primary Examiner* — Ponnoreay Pich
(74) *Attorney, Agent, or Firm* — Sheppard Mullen Richter & Hampton LLP (57) ABSTRACT

Authentication methods, apparatuses, and devices, including computer programs encoded on computer storage media are provided. One of the methods includes: receiving information to be authenticated from user input; sending an authentication request to an authentication client; determining a first time when the authentication request is sent to the authentication client and a second time when a jump operation from the browser to the authentication client is completed; when a time difference between the first time and the second time is greater than a threshold, sending an authentication result request to the authentication client; receiving a page jump request from the authentication client for jumping from the authentication client to the browser according to the identification information, the page jump request comprising an authentication result of the information to be authenticated; and displaying the authentication result according to the identification information.

20 Claims, 7 Drawing Sheets

(51) Int. Cl.
*G06F 16/955* (2019.01)
*G06F 21/45* (2013.01)

(52) U.S. Cl.
CPC .............. *G06F 21/45* (2013.01); *H04L 29/06* (2013.01); *H04L 63/0823* (2013.01); *H04L 63/0892* (2013.01)

(56) References Cited

U.S. PATENT DOCUMENTS

| | | | | |
|---|---|---|---|---|
| 2015/0007299 A1* | 1/2015 | Grajek | .................. | H04W 12/06 726/8 |
| 2019/0173881 A1* | 6/2019 | Zhang | .................. | G06F 16/9558 |

* cited by examiner

AUTHENTICATION METHOD, DEVICE AND AUTHENTICATION CLIENT

CROSS-REFERENCE TO RELATED APPLICATIONS

This application is a continuation application of U.S. patent application Ser. No. 16/272,852 filed on Feb. 11, 2019, which is a continuation application of International Application No. PCT/CN2017/095110, filed on Jul. 31, 2017. The PCT application claims priority to and benefits of the Chinese Patent Application No. 201610663316.8 filed with China National Intellectual Property Administration (CNIPA) of the People's Republic of China on Aug. 12, 2016. The entire contents of all of the above-identified applications are incorporated herein by reference.

TECHNICAL FIELD

This application relates to the field of Internet information processing technologies, and in particular, to an authentication method, an authentication device and an authentication client.

BACKGROUND

In commercial applications, for example, a user A is a transaction service demander, and a user B is a transaction service supplier; when the user B provides a transaction service to the user A, the user B needs to authenticate identity information provided by the user A.

A currently available authentication method typically comprises the following content:

First step, the user equipment used by the user A obtains, in a certain way, a link address of an authentication page from the user B;

Second step, the user A activates any browser installed in the user equipment used by the user A, and loads the authentication page corresponding to the link address obtained in the first step;

Third step, the user A inputs identity information to be authenticated on the authentication page, and sends an authentication request to an authentication client, the authentication request comprising the identity information to be authenticated;

Fourth step, upon receiving the authentication request, the authentication client performs authentication on the identity information to be authenticated comprised in the authentication request; and Fifth step, the authentication client pushes an authentication result to a default browser.

It has been found through research that the default browser set forth in the fifth step may be different from the browser activated in the second step, and at the point when the authentication result is received, the default browser is unable to determine the identity information corresponding to the authentication result, then determines that the identity information to be authenticated is lost, and re-initiates identity authentication. This process causes the authentication flow to take a long time and affects the user experience of a user regarding the authentication client.

SUMMARY

In view of this, embodiments of the specification provide an authentication method, an authentication device and an authentication client to solve the problem of current technologies that the authentication flow takes a long time.

The embodiments of the specification provide an authentication method. The method includes: receiving information to be authenticated from user input; sending an authentication request to an authentication client; determining a first time when the authentication request is sent to the authentication client and a second time when a jump operation from the browser to the authentication client is completed; when a time difference between the first time and the second time is greater than a threshold, sending an authentication result request to the authentication client; receiving a page jump request from the authentication client for jumping from the authentication client to the browser according to the identification information, the page jump request comprising an authentication result of the information to be authenticated; and displaying the authentication result according to the identification information. The authentication request comprises the information to be authenticated and a jump parameter for implementing a jump operation between the authentication client and the browser, and the jump parameter corresponds to identification information of the browser. The authentication method may be performed by a browser.

The embodiments of the specification further provide an authentication method, comprising: determining a first time when an authentication request is sent to an authentication client and a second time when a jump operation is completed, wherein the authentication request comprises information to be authenticated; when a time difference between the first time and the second time is greater than a threshold, sending an authentication result acquiring request to the authentication client, wherein the authentication result acquiring request is for obtaining an authentication result for the information to be authenticated; and upon receiving the authentication result sent from the authentication client, displaying the authentication result.

The embodiments of the specification further provide a non-transitory computer-readable storage medium. The storage medium stores instructions executable by one or more processors to cause the one or more processors to perform operations. The operations includes: receiving information to be authenticated from user input; sending an authentication request to an authentication client; determining a first time when the authentication request is sent to the authentication client and a second time when a jump operation from a browser to the authentication client is completed; when a time difference between the first time and the second time is greater than a threshold, sending an authentication result request to the authentication client; receiving a page jump request from the authentication client for jumping from the authentication client to the browser according to the identification information, the page jump request comprising an authentication result of the information to be authenticated; and displaying the authentication result according to the identification information. The authentication request comprises the information to be authenticated and a jump parameter for implementing a jump operation between the authentication client and the browser, and the jump parameter corresponds to identification information of the browser.

The embodiments of the specification further provide a non-transitory computer-readable storage medium. The storage medium stores instructions executable by one or more processors to cause the one or more processors to perform operations. The operations include: determining a first time when an authentication request is sent to an authentication client and a second time when a jump operation is completed, wherein the authentication request comprises information to be authenticated; when a time difference between the first time and the second time is greater than a threshold, send an authentication result acquiring request to the authentication client, wherein the authentication result acquiring request is for obtaining an authentication result for the information to be authenticated; and displaying, upon receiving the authentication result sent from the authentication client, the authentication result.

The embodiments of the specification further provide an authentication device. The device includes one or more non-transitory computer-readable memories, a signal receiver, a signal transmitter, and one or more processors.

There memories are configured to store instructions executable by the processors and a mapping file for executing authentication operations, and the mapping file comprises mapping relationships between identification information of one or more browsers and jump parameters of the one or more browsers.

The signal receiver is configured to receive an authentication request from a target browser, and the authentication request comprises information to be authenticated and a jump parameter used for implementing a jump between the target browser and the authentication device.

The one or more processors are configured to execute the instructions to cause the device to perform operations. The operations include: authenticating the information to be authenticated to obtain an authentication result; obtaining identification information of the target browser from a mapping file according to the jump parameter, wherein the identification information of the target browser corresponds to the jump parameter, and the mapping file comprises mapping relationships between identification information of one or more browsers and jump parameters of the one or more browsers; and the signal transmitter is configured to send a page jump request to the target browser according to the identification information of the target browser, wherein the page jump request comprises the authentication result.

The embodiments of the specification also provide another authentication device. The device may include one or more processors and a non-transitory computer-readable memory. The memory may be coupled to the one or more processors and configured with instructions executable by the one or more processors to perform operations. The operations may include: receiving information to be authenticated from user input; sending an authentication request to an authentication client; determining a first time when the authentication request is sent to the authentication client and a second time when a jump operation from a browser to the authentication client is completed; when a time difference between the first time and the second time is greater than a threshold, sending an authentication result request to the authentication client; receiving a page jump request from the authentication client for jumping from the authentication client to the browser according to the identification information, the page jump request comprising an authentication result of the information to be authenticated; and displaying the authentication result according to the identification information. The authentication request comprises the information to be authenticated and a jump parameter for implementing a jump operation between the authentication client and the browser, and the jump parameter corresponds to identification information of the browser.

At least one technical solution above employed by the embodiments of the specification can achieve the following advantageous effect: an authentication client receives an authentication request sent from a target browser, the authentication request comprising information to be authenticated and a jump parameter used for implementing a jump between the target browser and the authentication client; after authenticating the information to be authenticated to obtain an authentication result, searches for identification information of the target browser that matches the jump parameter from a mapping file according to the jump parameter, the mapping file comprising mapping relationships between identification information of different browsers and jump parameters of the browsers; and sends a page jump request to the target browser according to the identification information of the target browser, the page jump request comprising the authentication result. As such, after authenticating the information to be authenticated, the authentication client can determine the original browser that sends the authentication request according to the jump parameter carried in the authentication request, so that the authentication client sends the authentication result to the original browser, thereby effectively avoiding the problem in current technologies that an authentication result is lost due to the inability of an authentication client to accurately position an original browser that sends an authentication request, and improving the authentication efficiency.

BRIEF DESCRIPTION OF THE DRAWINGS

The accompanying drawings herein are used to provide a further understanding of the specification. The illustrative embodiments and description of the specification are used to describe the specification, and do not constitute inappropriate limitation to the specification. In the accompanying drawings.

DETAILED DESCRIPTION

In an iOS operating system, different applications are currently mutually independent. For the same user equipment, application software cannot accurately learn about what other application software is also installed on the user equipment. According to current technologies, therefore, an authentication client is unable to determine, after authenticating information, whether a browser identical with the browser used for sending an authentication request is installed locally. Therefore, the authentication result can be sent only to a default browser according to an authentication client, as a result, the default browser is unable to recognize the authentication result upon receiving the authentication result, which leads to the loss of user information. At this point, an authentication request has to be re-initiated, which extends the authentication flow.

To achieve the objective of the specification, the embodiments of the specification provide an authentication method, an authentication device and an authentication client. The authentication client receives an authentication request sent from a target browser, the authentication request comprising information to be authenticated and a jump parameter used for implementing a jump between the target browser and the authentication client; after authenticating the information to be authenticated to obtain an authentication result, the authentication client searches for identification information of the target browser that matches the jump parameter from a mapping file according to the jump parameter, the mapping file comprising mapping relationships between identification information of different browsers and jump parameters of the browsers; and the authentication client sends a page jump request to the target browser according to the identification information of the target browser, the page jump request comprising the authentication result. As such, after authenticating the information to be authenticated, the authentication client can determine the original browser that sends the authentication request according to the jump parameter carried in the authentication request, so that the authentication client sends the authentication result to the original browser, thereby effectively avoiding the problem in current technologies that an authentication result is lost due to the inability of an authentication client to accurately identify an original browser that sends an authentication request, and improving the authentication efficiency.

Application scenarios of the embodiments of the specification can comprise initiating an authentication request through a browser, at this moment the authentication request jumps into an authentication application, the authentication application performs authentication on the authentication information comprised in the authentication request, and displays the authentication result in the original browser.

For example, a user A obtains a link address of an authentication page by scanning a code and randomly selects a browser for loading the authentication page corresponding to the link address; the user A inputs information to be authenticated on the loaded authentication page, and sends the information to be authenticated via the browser to an authentication client; the authentication client can be installed in user equipment used by a user B, then the authentication client performs authentication on the received information to be authenticated, successfully invokes a browser that is the same as the one selected by the user A when the authentication is passed, and displays an authentication result in a page of the browser.

The authentication client according to the embodiments of the specification can support an iOS operating system and can also support an operating system similar to iOS, which is not limited by the embodiments herein.

The identification information of the browser in the embodiments of the specification can be read from an installation package of the browser, and the identification information of the browser in the embodiments of the specification can also be referred to as a browser identifier (or source application). For different browsers, a jump parameter invoked when a jump operation is executed is different. Such difference may refer to a different format, or other types of differences, which is not limited by the embodiments herein. The common feature is that the jump parameter comprises a browser identifier.

To make the objective, technical solutions, and advantages of the specification clearer, the technical solutions of the specification will be clearly and completely described below with reference to exemplary embodiments and corresponding accompanying drawings. The described embodiments are merely some, not all, embodiments. All other embodiments obtainable by a person skilled in the art without creative effort and on the basis of the embodiments of the specification shall fall within the scope of the specification.

The technical solutions according to the embodiments of the specification will be described in detail with reference to the accompanying drawings.

Figure 1:
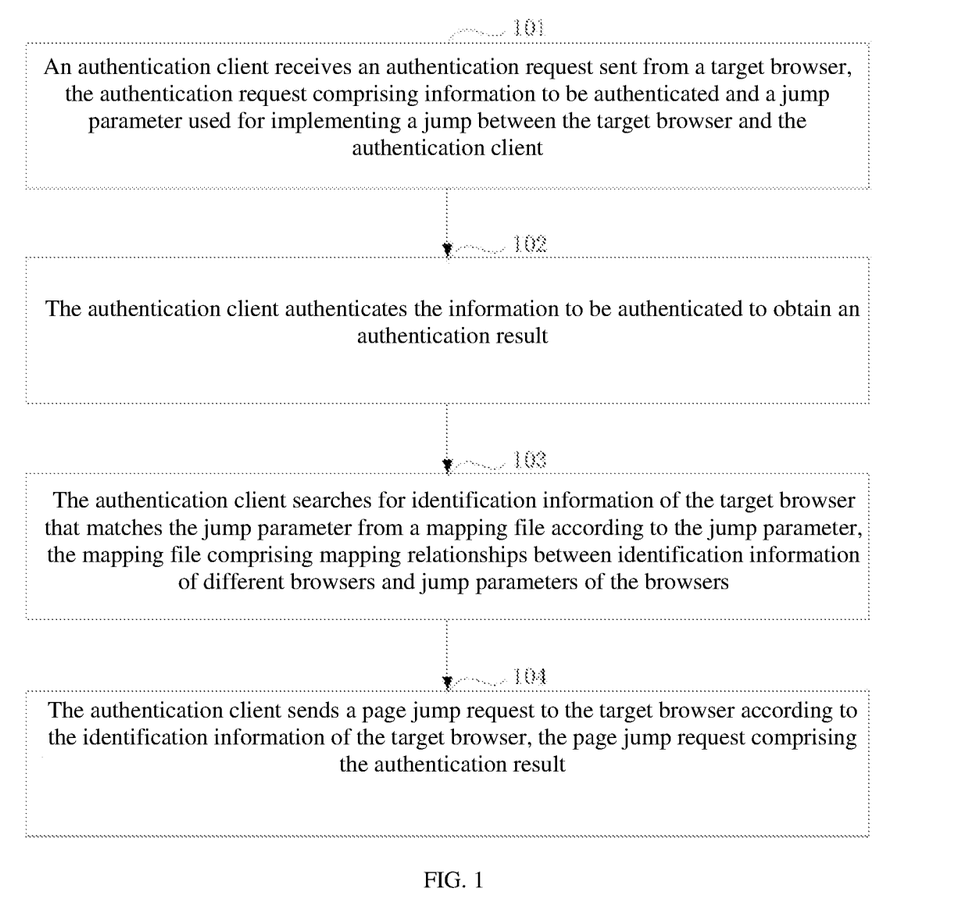
FIG. 1 is a flow chart of an authentication method according to some embodiments of the specification.

FIG. 1 is a flow chart of an authentication method according to some embodiments of the specification. The method is described as follows.

Step 101: an authentication client receives an authentication request sent from a target browser, the authentication request comprising information to be authenticated and a jump parameter used for implementing a jump between the target browser and the authentication client.

In Step 101, assuming an application scenario in which a user A and a user B conduct transaction cooperation through consultation, the user B needs to authenticate information (including identity information) provided by the user A. At this moment, the user B provides a link address of an authentication page to the user A. In some embodiments of the specification, the link address of the authentication page can be information of a real address, a 2D code, or another format, which is not limited by the embodiments herein.

If the link address of the authentication page provided by the user B to the user A is a 2D code, the user A obtains the link address of the authentication page by scanning the code or in another manner, activates any browser installed in the user equipment used by the user A, and sends an authentication page access request to a server, the authentication page access request comprising the link address; the browser receives the page information sent from the server and displays the page information.

The user A inputs information to be authenticated on the displayed page, and triggers an authentication control in the page, which is deemed as initiating an authentication request. Since the authentication control comprises an address of the authentication client, a page jump request is initiated at this point for jumping to the authentication client, the page jump request comprising the jump parameter and the information to be authenticated. The page jump request here can be deemed as initiating an authentication request to the authentication client.

The jump parameter here can be a scheme parameter, i.e., a Uniform Resource Identifier (URI) of a local application is opened in the iOS operating system. The URI is a character string for identifying a name of an Internet resource and can be construed in the embodiments of the specification as a name character string of a browser.

A browser generates a jump parameter when executing a jump operation, the jump parameter comprising identification information of the browser (i.e., the name character string of the browser). As such, which browser executes the jump operation can be determined according to the jump parameter.

Optionally, when triggering the authentication control in the page, the method further comprises: performing encryption on the information to be authenticated that is inputted by the user to obtain encrypted information to be authenticated.

For example, if the user A inputs user identity information, then a token is generated according to the user identity information, and the token can be deemed as the encrypted information to be authenticated.

When an authentication request is sent to the authentication client, the encrypted information to be authenticated can be carried in the authentication request and sent to the authentication client.

For example, the authentication client receives the authentication request sent from the browser.

Step 102: the authentication client authenticates the information to be authenticated to obtain an authentication result.

In Step 102, the authentication client analyzes the received information to be authenticated. If it is determined that the information to be authenticated is encrypted identity authentication information, then the encrypted identity authentication information comprised in the authentication request is decrypted, and the decrypted identity authentication information is authenticated to obtain an authentication result.

If it is determined that the information to be authenticated is non-encrypted identity authentication information, the information to be authenticated is directly authenticated to obtain an authentication result.

Optionally, when the authentication result is obtained, the method further comprises:

the authentication client can further determine whether the authentication request is sent from a browser or from application software, and if it is determined that the authentication request is sent from a browser, proceeding to execute Step 103;

if it is determined that the authentication request is sent from application software, sending the authentication result to the application software.

In other words, the authentication request received by the authentication client in Step 101 can be sent from a browser or from application software, which is not limited by the embodiments herein.

A manner in which whether the authentication request is sent from a browser or from application software is determined includes, but is not limited to:

analyzing the authentication result, and if the authentication result comprises a page address and the header field is http/https, then determining that the authentication result is sent from a browser; otherwise, determining that the authentication request is sent from application software.

Step 103: the authentication client searches for identification information of the target browser that matches the jump parameter from a mapping file according to the jump parameter, the mapping file comprising mapping relationships between identification information of different browsers and jump parameters of the browsers.

In Step 103, the authentication client obtains a source application parameter when receiving the authentication request.

For example, when the user equipment sends the authentication request to the authentication client, the user equipment's operating system invokes operation information of the browser, obtains the source application parameter (i.e., [-application: open URL: source application: annotation]), determines a jump parameter according to the obtained source application parameter, and places the jump parameter in the authentication request that is sent to the authentication client, so that the authentication client can determine the identification information of the original browser that executes the jump operation according to the jump parameter.

For example, the authentication client searches for identification information of the browser corresponding to the received jump parameter from a mapping file according to the stored mapping relationships between identification information and jump parameters of the browsers, and determines the original browser that executes the jump operation according to the found identification information of the browser.

Optionally, the method further comprises:

when the authentication client cannot find identification information of the target browser that matches the jump parameter from the mapping file, sending a mapping file updating request comprising the jump parameter to a server, the mapping file updating request being used for the server to determine identification information of a browser that matches the jump parameter according to the jump parameter and update the mapping file.

In an exemplary application, a mapping file can be generated by a server and sent to an authentication client or can be generated by the authentication client, which is not limited by the embodiments herein.

Optionally, when the authentication client cannot find identification information of the target browser that matches the jump parameter from the mapping file, the authentication client obtains the source application parameter and during the next cold start, sends the stored source application parameter to the server.

Upon receiving the source application parameter, the server finds a browser corresponding to the source application parameter, downloads an installation package of the browser, decompresses the installation package of the browser to obtain an ipa package of the browser, and obtains an info.plist file from the ipa package. The server finds a URL typeset in the info.plist file, determines URL Schems corresponding to the URL typeset, and finds a scheme corresponding to the browser in URL Schems. The sever then establishes a mapping relationship between the found identification information of the browser and scheme, and updates the mapping file with the established mapping relationship.

After updating the mapping file, the server sends the updated mapping file to the authentication client when detecting that the authentication client restarts.

Figure 2:
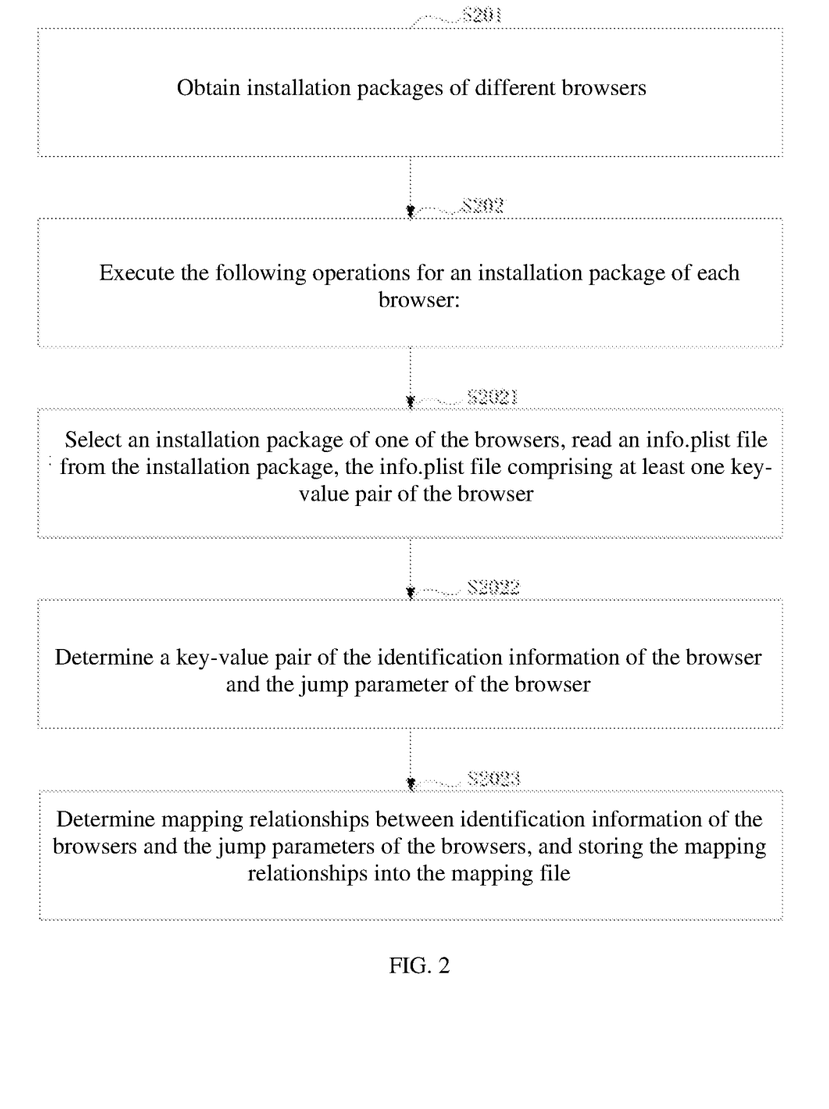
FIG. 2 is a schematic diagram of a manner for determining a mapping file according to some embodiments of the specification.

The manner for determining the mapping file will be described in detail below.

FIG. 2 is a schematic diagram of a manner for determining a mapping file according to some embodiments of the specification.

S201: obtain installation packages of different browsers.

S202: execute the following operations for an installation package of each browser:

S2021: select an installation package of one of the browsers and read the info.plist file from the installation package, the info.plist file comprising at least one key-value pair of the browser.

For example, the selected installation package of the browser is decompressed to obtain an ipa package of the browser, and the info.plist file is obtained from the ipa package. The info.plist file comprises a plurality of key-value pairs for the browser.

These key-value pairs comprise the identification information of the browser and the jump parameter of the browser.

S2022: determine a key-value pair of the identification information of the browser and the jump parameter of the browser.

For example, the URL typeset is found in the info.plist file, URL Schems corresponding to the URL typeset is determined, and a scheme corresponding to the browser is found in URL Schems. The scheme can be referred to as a jump parameter.

When the number of found schemes is greater than 1, a scheme is selected when its corresponding name is the closest to the name of the browser.

In addition, Bundle identifier (the identification information of the browser, i.e., the source application) is found from the info.plist file. At this point, the combination of Bundle identifier and the selected scheme is referred to as a confirmed key-value pair of the identification information of the browser and the jump parameter of the browser.

S2023: determine a mapping relationship between the identification information of the browser and the jump parameter of the browser, and store the mapping relationship into the mapping file.

Step 104: the authentication client sends a page jump request to the target browser according to the identification information of the target browser, the page jump request comprising the authentication result.

In Step 104, the authentication client sends a page jump request to the target browser according to the identification information of the target browser, so that the target browser displays, upon receiving the page jump request, the authentication result comprised in the page jump request.

According to the technical solution provided in the embodiments of the specification, the authentication client receives an authentication request sent from a target browser, the authentication request comprising information to be authenticated and a jump parameter used for implementing a jump between the target browser and the authentication client; after authenticating the information to be authenticated to obtain an authentication result, the authentication client searches for identification information of the target browser that matches the jump parameter from a mapping file according to the jump parameter, the mapping file comprising mapping relationships between identification information of different browsers and jump parameters of the browsers; and the authentication client sends a page jump request to the target browser according to the identification information of the target browser, the page jump request comprising the authentication result. As such, after authenticating the information to be authenticated, the authentication client can determine the original browser that sends the authentication request according to the jump parameter carried in the authentication request, so that the authentication client sends the authentication result to the original browser, thereby effectively avoiding the problem in current technologies that an authentication result is lost due to the inability of an authentication client to accurately identify an original browser that sends an authentication request, and improving the authentication efficiency.

Figure 3:
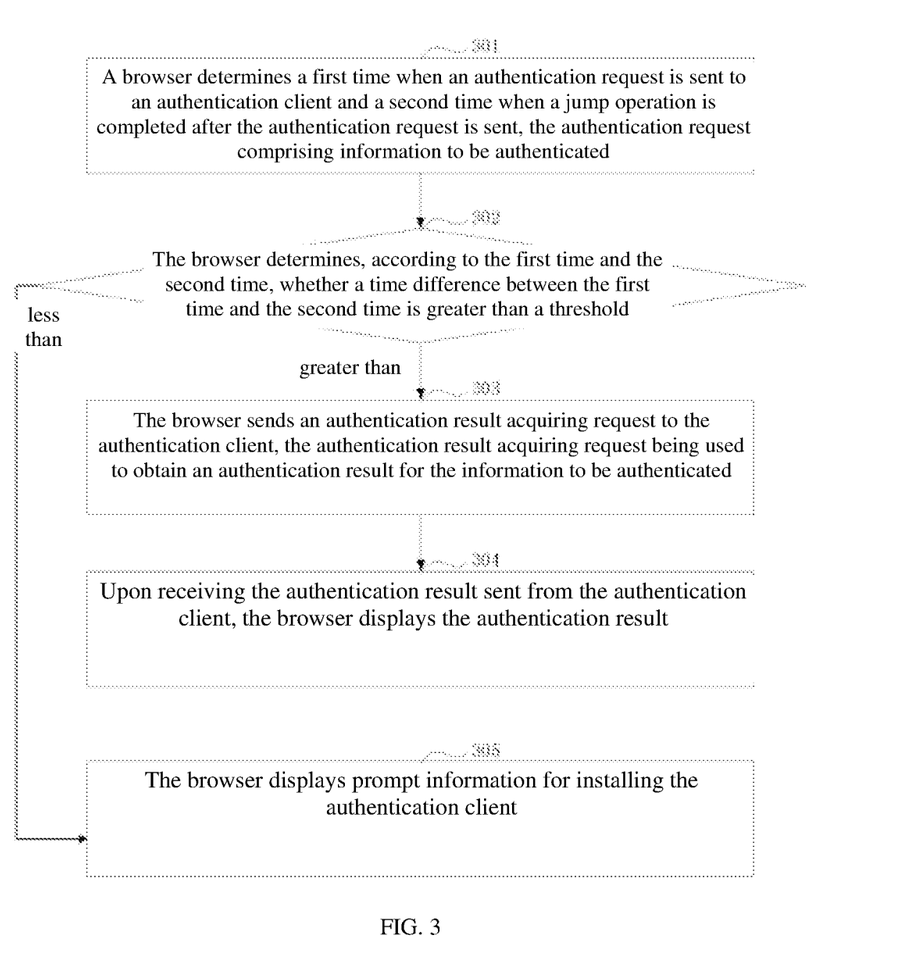
FIG. 3 is a flow chart of an authentication method according to some embodiments of the specification.

FIG. 3 is a flow chart of an authentication method according to some embodiments of the specification. The method is described as follows.

Step 301: a browser determines a first time when an authentication request is sent to an authentication client and a second time when a jump operation is completed after the authentication request is sent, the authentication request comprising information to be authenticated.

In Step 301, when a user A and a user B conduct transaction cooperation through consultation, the user B needs to authenticate information (including identity information) provided by the user A. At this moment, the user B provides a link address of an authentication page to the user A. In some embodiments of the specification, the link address of the authentication page can be information of a real address, a 2D code, or another format, which is not limited by the embodiments herein.

If the link address of the authentication page provided by the user B to the user A is a 2D code, the user A obtains the link address of the authentication page by scanning the code or in another manner, activates any browser installed in the user equipment used by the user A, and sends an authentication page access request to a server, the authentication page access request comprising the link address; the browser receives the page information sent from the server and displays the page information.

The user A inputs information to be authenticated on the displayed page, and triggers an authentication control in the page, which is deemed as initiating an authentication request. At this point, the browser records the time stamp of triggering the authentication control in the page as the first time.

After the authentication control in the page is triggered, the browser executes a jump operation, and when the execution of the jump operation is completed, records the time stamp when the execution of the jump operation is completed as the second time.

Step 302: the browser determines, according to the first time and the second time, whether a time difference between the first time and the second time is greater than a threshold; if the time difference is greater than the threshold, goes to Step 303; otherwise, goes to Step 305.

In Step 302, a time difference between the first time and the second time is calculated and the relative magnitude between the time difference and the threshold is further determined.

The threshold can be determined according to actual needs or according to experimental data, which is not limited by the embodiments herein. For example, the threshold is 2 s.

For example, in an iOS platform, once a page is under a backend operation, the code logic will be blocked. When the authentication control in the page is triggered, a jump is made to the authentication client. If the time difference between the first time and the second time is greater than the threshold, it is determined that the jump is successful. If the time difference between the first time and the second time is not greater than the threshold, it is determined that the jump fails.

Step 303: the browser sends an authentication result acquiring request to the authentication client, the authentication result acquiring request being used to obtain an authentication result for the information to be authenticated.

Step 304: upon receiving the authentication result sent from the authentication client, the browser displays the authentication result.

Step 305: the browser displays prompt information for installing the authentication client.

Figure 4:
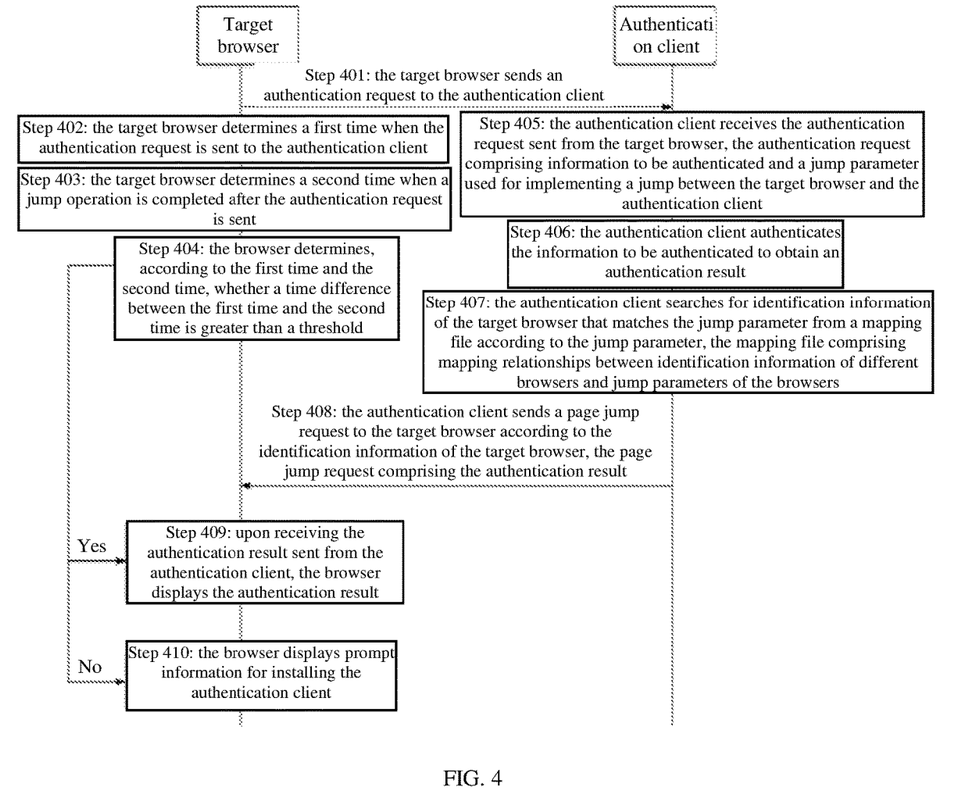
FIG. 4 is a flow chart of an authentication method according to some embodiments of the specification.

FIG. 4 is a flow chart of an authentication method according to some embodiments of the specification. The method is described as follows.

Step 401: a target browser sends an authentication request to an authentication client.

Step 402: the target browser determines a first time when the authentication request is sent to the authentication client.

Step 403: the target browser determines a second time when a jump operation is completed after the authentication request is sent.

Step 404: the browser determines, according to the first time and the second time, whether a time difference between the first time and the second time is greater than a threshold; if the time difference is greater than the threshold, goes to Step 409; otherwise, goes to Step 410.

Step 405: the authentication client receives the authentication request sent from the target browser, the authentication request comprising information to be authenticated and a jump parameter used for implementing a jump between the target browser and the authentication client.

Step 406: the authentication client authenticates the information to be authenticated to obtain an authentication result.

Optionally, in Step 406, the browser sends an authentication result acquiring request to the authentication client, the authentication result acquiring request being used to obtain an authentication result for the information to be authenticated, and jumps to execute Step 409.

Step 407: the authentication client searches for identification information of the target browser that matches the jump parameter from a mapping file according to the jump parameter, the mapping file comprising mapping relationships between identification information of different browsers and jump parameters of the browsers.

Step 408: the authentication client sends a page jump request to the target browser according to the identification information of the target browser, the page jump request comprising the authentication result.

Step 402 to Step 404 and Step 405 to Step 408 in the embodiments of the specification can be executed simultaneously or can be executed sequentially.

Step 409: upon receiving the authentication result sent from the authentication client, the browser displays the authentication result.

Step 410: the browser displays prompt information for installing the authentication client.

Figure 5:
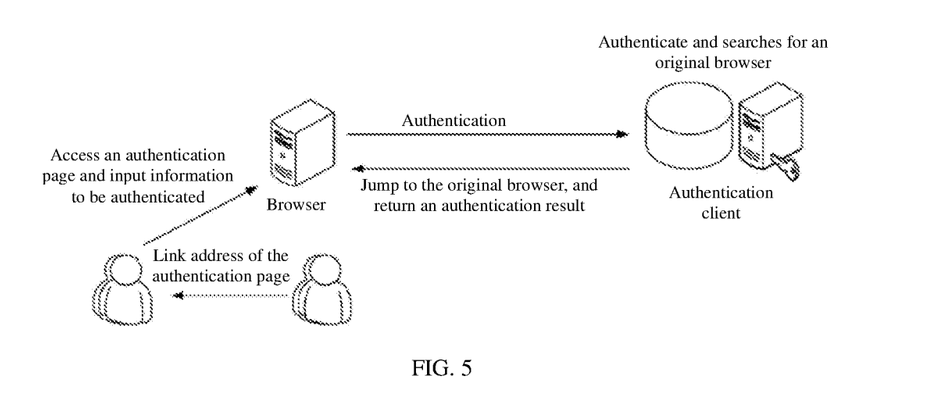
FIG. 5 is a schematic diagram of a scenario of an authentication method according to some embodiments of the specification.

FIG. 5 is a schematic diagram of a scenario of an authentication method according to some embodiments of the specification.

Figure 6:
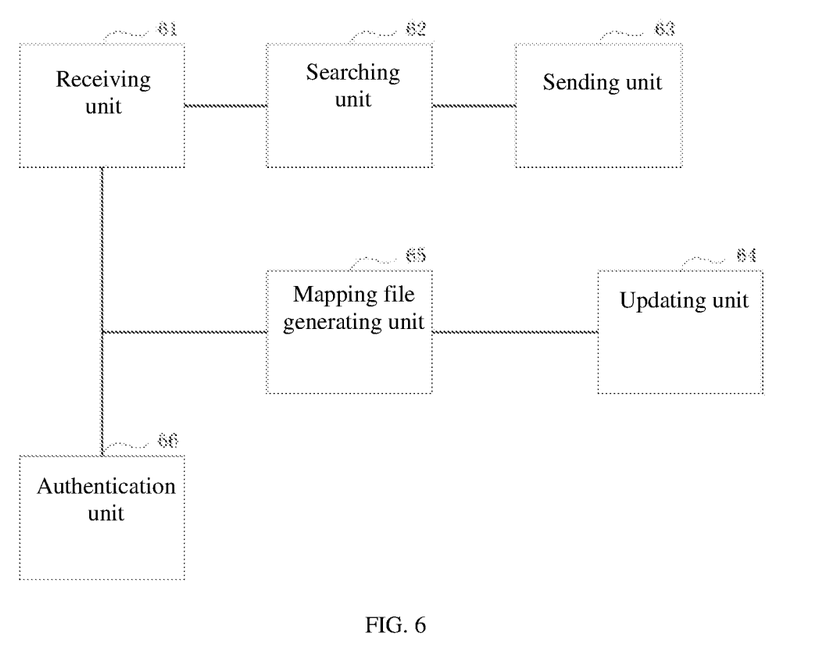
FIG. 6 is a schematic structural diagram of an authentication device according to some embodiments of the specification.

FIG. 6 is a schematic structural diagram of an authentication device according to some embodiments of the specification. The authentication device comprises a receiving unit 61, a searching unit 62, and a sending unit 63.

The receiving unit 61 is configured to receive an authentication request sent from a target browser, the authentication request comprising information to be authenticated and a jump parameter used for implementing a jump between the target browser and the authentication device.

The searching unit 62 is configured to find, after authenticating the information to be authenticated to obtain an authentication result, identification information of the target browser that matches the jump parameter from a mapping file according to the jump parameter, the mapping file comprising mapping relationships between identification information of different browsers and jump parameters of the browsers.

The sending unit 63 is configured to send a page jump request to the target browser according to the identification information of the target browser, the page jump request comprising the authentication result.

In some other embodiments of the specification, the authentication device further comprises an updating unit 64, which is configured to send, when identification information of the target browser that matches the jump parameter cannot be found from the mapping file, a mapping file updating request comprising the jump parameter to a server, the mapping file updating request being used for the server to determine identification information of a browser that matches the jump parameter according to the jump parameter and update the mapping file.

In some other embodiments of the specification, the searching unit 62 searching for identification information of the target browser that matches the jump parameter from a mapping file according to the jump parameter comprises: according to the mapping relationships between identification information and jump parameters of the browsers stored in the mapping file, searching for identification information of the target browser having a mapping relationship with the jump parameter from the mapping file, the jump parameter being comprised in the received authentication request.

In some other embodiments of the specification, the authentication device further comprises a mapping file generating unit 65, which is configured to obtain the mapping file in the following manner. The following operations are executed for different browsers, respectively: obtaining an installation package of a browser, and reading an info.plist file from the installation package, the info.plist file comprising at least one key-value pair of the browser; searching for a key-value pair of the identification information of the browser and the jump parameter of the browser in the info.plist file; and determining mapping relationships between identification information of the browsers and the jump parameters of the browsers, and storing the mapping relationships into the mapping file.

In some other embodiments of the specification, the information to be authenticated is encrypted identity authentication information; and the authentication device further comprises an authentication unit 66.

The authentication unit 66 is configured to authenticate the information to be authenticated to obtain an authentication result, comprising: decrypting the encrypted identity authentication information comprised in the authentication request, and authenticating the decrypted identity authentication information to obtain an authentication result.

The authentication device set forth in the embodiments of the specification can be implemented in a software manner or in a hardware manner, which is not limited by the embodiments herein. After authenticating the information to be authenticated, the authentication device can determine the original browser that sends the authentication request according to the jump parameter carried in the authentication request, so that the authentication client sends the authentication result to the original browser, thereby effectively avoiding the problem in current technologies that an authentication result is lost due to the inability of an authentication client to accurately identify an original browser that sends an authentication request, and improving the authentication efficiency.

Figure 7:
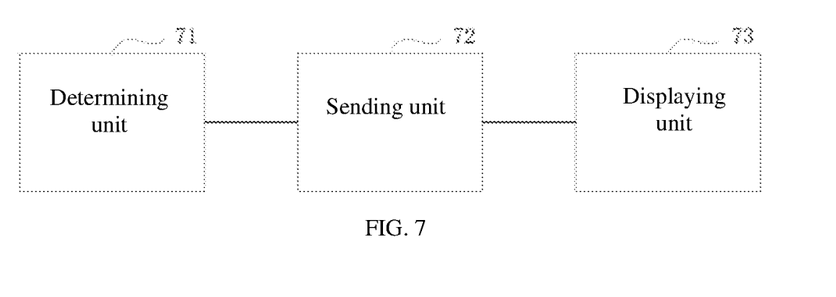
FIG. 7 is a schematic structural diagram of an authentication device according to some embodiments of the specification.

FIG. 7 is a schematic structural diagram of an authentication device according to some embodiments of the specification. The authentication device comprises a determining unit 71, a sending unit 72, and a displaying unit 73, which is configured to determine a first time when an authentication request is sent to an authentication client and a second time when a jump operation is completed after the authentication request is sent, the authentication request comprising information to be authenticated; the sending unit 72 is configured to send, when determining that a time difference between the first time and the second time is greater than a threshold, an authentication result acquiring request to the authentication client, the authentication result acquiring request being used to obtain an authentication result for the information to be authenticated; and the displaying unit 73 is configured to display, upon receiving the authentication result sent from the authentication client, the authentication result.

In some other embodiments of the specification, the displaying unit 73 is configured to display, when determining that the time difference between the first time and the second time is not greater than the threshold, prompt information for installing the authentication client.

The authentication device set forth in the embodiments of the specification can be implemented in a software manner or in a hardware manner, which is not limited by the embodiments herein. The authentication device set forth in the embodiments of the specification can be a browser. The browser infers, by determining an execution time for different operations, whether an authentication jump process is successfully executed, and when the execution is successful, requests the authentication result from the authentication client, so that the user can obtain the authentication result as quickly as possible, thereby improving the execution efficiency of authentication.

Figure 8:
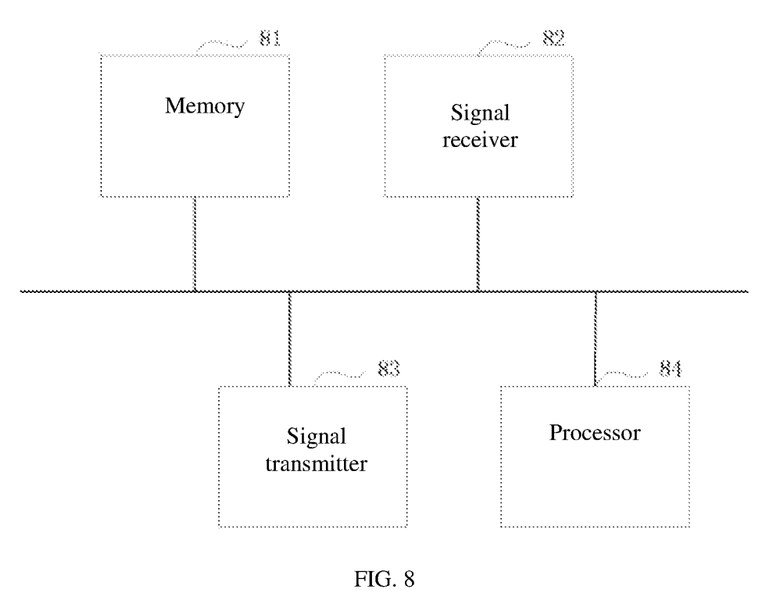
FIG. 8 is a schematic structural diagram of an authentication client according to some embodiments of the specification.

FIG. 8 is a schematic structural diagram of an authentication client according to some embodiments of the specification. The authentication client comprises a memory 81, a signal receiver 82, a signal transmitter 83, and a processor 84. The memory 81 is configured to store program code and a mapping file for executing authentication operations, the mapping file comprising mapping relationships between identification information of different browsers and jump parameters of the browsers. The signal receiver 82 is configured to receive an authentication request sent from a target browser, the authentication request comprising information to be authenticated and a jump parameter used for implementing a jump between the target browser and the authentication device. The processor 84 is configured to run the program code stored in the memory and execute the following operations of: after authenticating the information to be authenticated received by the signal receiver to obtain an authentication result, searching for identification information of the target browser that matches the jump parameter from the mapping file according to the jump parameter received by the signal receiver, the mapping file comprising mapping relationships between identification information of different browsers and jump parameters of the browsers; and instructing the signal transmitter to send a page jump request to the target browser according to the identification information of the target browser, the page jump request comprising the authentication result. The signal transmitter 83 is configured to send a page jump request to the target browser according to the identification information of the target browser.

The processor according to some embodiments of the specification can be a Central Processing Unit or can be another controller, which is not limited by the embodiments herein.

After authenticating the information to be authenticated, the authentication client can determine the original browser that sends the authentication request according to the jump parameter carried in the authentication request, so that the authentication client sends the authentication result to the original browser, thereby effectively avoiding the problem in current technologies that an authentication result is lost due to the inability of an authentication client to accurately identify an original browser that sends an authentication request, and improving the authentication efficiency.

A person skilled in the art should understand that the embodiments of the present invention may be provided as a method, a system, or a computer program product. Therefore, the present invention may be implemented as a complete hardware embodiment, a complete software embodiment, or an embodiment combing software and hardware.

Moreover, the present invention may be in the form of a computer program product implemented on one or more computer usable storage media (including, but not limited to, a magnetic disk memory, CD-ROM, an optical memory, and the like) comprising computer usable program code therein.

The present invention is described with reference to the flow charts and/or block diagrams of the method, device (system), and computer program product according to the embodiments of the present invention. It should be understood that every process and/or block of the flow charts and/or block diagrams and a combination of processes and/or blocks of the flow charts and/or block diagrams can be implemented by computer program instructions. These computer program instructions can be provided to a general-purpose computer, a dedicated computer, an embedded processor, or a processor of another programmable data processing device, thereby producing a machine and causing these instructions to, when executed by the computer or the processor of another programmable data processing device, produce an apparatus for implementing functions specified in one or more processes in the flow charts and/or one or more blocks in the block diagrams.

These computer program instructions can also be stored in a computer readable storage medium capable of guiding a computer or other programmable data processing devices to work in a particular manner, so that the instructions stored in the computer readable storage medium produce a manufactured article that includes an instruction device for implementing functions specified in one or more processes in the flow charts and/or one or more blocks in the block diagrams.

These computer program instructions can also be loaded onto a computer or other programmable data processing devices, causing a series of operating steps to be executed on the computer or other programmable data processing devices to produce a process of computer implementation, thereby enabling instructions executed on the computer or other programmable data processing devices to implement functions specified in one or more processes in the flow charts and/or one or more blocks in the block diagrams.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including", "comprising" or any other variants thereof intend to encompass a non-exclusive inclusion, so that a process, method, commodity or device comprising a series of elements not only comprises these elements, but also comprises other elements that are not specifically listed, or further comprises elements that are inherent to the process, method, commodity or device. When there is no further restriction, elements defined by the statement "comprising one . . . " do not exclude that a process, method, commodity or device comprising the above elements further comprises additional identical elements.

A person skilled in the art should understand that the embodiments of the specification may be provided as a method, a system, or a computer program product. Therefore, the specification may be implemented as a complete hardware embodiment, a complete software embodiment, or an embodiment combing software and hardware. Moreover, the specification may be in the form of a computer program product implemented on one or more computer usable storage media (including, but not limited to, a magnetic disk memory, CD-ROM, an optical memory, and the like) comprising computer usable program code therein.

Only embodiments of the specification are described above, which are not used to limit the application. To a person skilled in the art, the specification may have various modifications and changes. Any modification, equivalent substitution or improvement made within the spirit and principle of the application shall be encompassed by the claims of the application.

What is claimed is:

1. An authentication method, performed by a browser, comprising:
    receiving information to be authenticated from user input;
    sending an authentication request to an authentication client, wherein the authentication request comprises the information to be authenticated and a jump parameter for implementing a jump operation between the authentication client and the browser, and the jump parameter corresponds to identification information of the browser;
    determining a first time when the authentication request is sent to the authentication client and a second time when a jump operation from the browser to the authentication client is completed;
    when a time difference between the first time and the second time is greater than a threshold, sending an authentication result request to the authentication client;
    receiving a page jump request from the authentication client for jumping from the authentication client to the browser according to the identification information, the page jump request comprising an authentication result of the information to be authenticated; and
    displaying the authentication result according to the identification information.

2. The authentication method according to claim 1, further comprising:
    when the time difference between the first time and the second time is not greater than the threshold, displaying prompt information for installing the authentication client.

3. The authentication method according to claim 1, wherein the jump parameter corresponds to the identification information of the browser from a mapping file, and the mapping file comprises mapping relationships between identification information of one or more browsers and jump parameters of the one or more browsers.

4. The authentication method according to claim 3, wherein the mapping relationships are based on key-value pairs of the identification information of the one or more browsers and the jump parameters of the one or more browsers in installation packages of the one or more browsers.

5. The authentication method according to claim 1, wherein the information to be authenticated comprises encrypted identity authentication information.

6. The authentication method according to claim 1, before the receiving information to be authenticated from the user input, further comprising:
    displaying an authentication page comprising an authentication control for initiating the authentication request.

7. The authentication method according to claim 1, wherein the jump parameter comprises a Uniform Resource Identifier.

8. A non-transitory computer-readable storage medium, storing instructions executable by one or more processors to cause the one or more processors to perform operations comprising:
    receiving information to be authenticated from user input;
    sending an authentication request to an authentication client, wherein the authentication request comprises the information to be authenticated and a jump parameter for implementing a jump operation between the authentication client and a browser, and the jump parameter corresponds to identification information of the browser;
    determining a first time when the authentication request is sent to the authentication client and a second time when a jump operation from the browser to the authentication client is completed;
    when a time difference between the first time and the second time is greater than a threshold, sending an authentication result request to the authentication client;
    receiving a page jump request from the authentication client for jumping from the authentication client to the browser according to the identification information, the page jump request comprising an authentication result of the information to be authenticated; and
    displaying the authentication result according to the identification information.

9. The non-transitory computer-readable storage medium according to claim 8, wherein the operations further comprise:
    when the time difference between the first time and the second time is not greater than the threshold, displaying prompt information for installing the authentication client.

10. The non-transitory computer-readable storage medium according to claim 8, wherein the jump parameter corresponds to the identification information of the browser from a mapping file, and the mapping file comprises mapping relationships between identification information of one or more browsers and jump parameters of the one or more browsers.

11. The non-transitory computer-readable storage medium according to claim 10, wherein the mapping relationships are based on key-value pairs of the identification information of the one or more browsers and the jump parameters of the one or more browsers in installation packages of the one or more browsers.

12. The non-transitory computer-readable storage medium according to claim 8, wherein the information to be authenticated is encrypted identity authentication information.

13. The non-transitory computer-readable storage medium according to claim 8, wherein the jump parameter comprises a Uniform Resource Identifier.

14. The non-transitory computer-readable storage medium according to claim 8, wherein before the receiving information to be authenticated from the user input, the operations further comprise:
  displaying an authentication page comprising an authentication control for initiating the authentication request.

15. An authentication device, comprising one or more processors and a non-transitory computer-readable memory coupled to the one or more processors and configured with instructions executable by the one or more processors to perform operations comprising:
  receiving information to be authenticated from user input;
  sending an authentication request to an authentication client, wherein the authentication request comprises the information to be authenticated and a jump parameter for implementing a jump operation between the authentication client and a browser, and the jump parameter corresponds to identification information of the browser;
  determining a first time when the authentication request is sent to the authentication client and a second time when a jump operation from the browser to the authentication client is completed;
  when a time difference between the first time and the second time is greater than a threshold, sending an authentication result request to the authentication client;
  receiving a page jump request from the authentication client for jumping from the authentication client to the browser according to the identification information, the page jump request comprising an authentication result of the information to be authenticated; and
  displaying the authentication result according to the identification information.

16. The authentication device according to claim 15, wherein the operations further comprise:
  when the time difference between the first time and the second time is not greater than the threshold, displaying prompt information for installing the authentication client.

17. The authentication device according to claim 15, wherein the jump parameter corresponds to the identification information of the browser from a mapping file, and the mapping file comprises mapping relationships between identification information of one or more browsers and jump parameters of the one or more browsers.

18. The authentication device according to claim 15, wherein the information to be authenticated is encrypted identity authentication information.

19. The authentication device according to claim 15, wherein the jump parameter comprises a Uniform Resource Identifier.

20. The authentication device according to claim 15, wherein before the receiving information to be authenticated from the user input, the operations further comprise:
  displaying an authentication page comprising an authentication control for initiating the authentication request.

\* \* \* \* \*